(12) United States Patent
Gou et al.

(10) Patent No.: US 9,332,527 B2
(45) Date of Patent: May 3, 2016

(54) METHOD AND APPARATUS FOR PROCESSING MULTIMEDIA BROADCAST MULTICAST SERVICE (MBMS) COUNTING MESSAGE

(75) Inventors: Wei Gou, Shenzhen (CN); Bin Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 762 days.

(21) Appl. No.: 13/696,783

(22) PCT Filed: Apr. 25, 2011

(86) PCT No.: PCT/CN2011/073279
§ 371 (c)(1),
(2), (4) Date: Nov. 7, 2012

(87) PCT Pub. No.: WO2011/147242
PCT Pub. Date: Dec. 1, 2011

(65) Prior Publication Data
US 2013/0051306 A1 Feb. 28, 2013

(30) Foreign Application Priority Data

May 27, 2010 (CN) .......................... 2010 1 0187330

(51) Int. Cl.
| | |
|---|---|
| H04H 20/71 | (2008.01) |
| H04W 72/00 | (2009.01) |
| H04W 4/06 | (2009.01) |
| H04W 48/12 | (2009.01) |

(52) U.S. Cl.
CPC ............ H04W 72/005 (2013.01); H04W 48/12 (2013.01)

(58) Field of Classification Search
None
See application file for complete search history.

(56) References Cited

U.S. PATENT DOCUMENTS

| 7,349,711 B2 | 3/2008 | Hu |
|---|---|---|
| 2006/0094408 A1 | 5/2006 | Hu |

(Continued)

FOREIGN PATENT DOCUMENTS

| CN | 1684469 A | 10/2005 |
|---|---|---|
| CN | 101047873 A | 10/2007 |

(Continued)

OTHER PUBLICATIONS

International Search Report in international application No. PCT/CN2011/073279, mailed on Aug. 4, 2011.

(Continued)

*Primary Examiner* — Ayaz Sheikh
*Assistant Examiner* — Sori Aga
(74) *Attorney, Agent, or Firm* — Oppedahl Patent Law Firm LLC

(57) ABSTRACT

The disclosure provides a method for processing a Multimedia Broadcast Multicast Service (MBMS) counting message. The method includes: a network side configures counting message for performing feedback counting on an MBMS service; and the network side determines a Multimedia Broadcast Multicast Service Single Frequency Network (MBSFN) area to which the counted MBMS belongs and a Multimedia Control Channel (MCCH) which corresponds to the MBSFN area, and transmits the counting message to user equipment (UE) through the MCCH which corresponds to the MBSFN area, or transmits the counting message to the UE through a Broadcast Control Channel (BCCH). The disclosure also discloses an apparatus for processing an MBMS counting message. By using the method and the apparatus provided by the disclosure, the network side can know the reception situation of the MBMS service in the MBSFN area.

8 Claims, 3 Drawing Sheets

(56) References Cited

U.S. PATENT DOCUMENTS

| | | |
|---|---|---|
| 2008/0043658 A1* | 2/2008 | Worrall .................. 370/312 |
| 2008/0274759 A1 | 11/2008 | Chen et al. |
| 2008/0305739 A1 | 12/2008 | Huang |
| 2011/0021224 A1* | 1/2011 | Koskinen et al. ............ 455/507 |
| 2013/0051306 A1 | 2/2013 | Gou |

FOREIGN PATENT DOCUMENTS

| | | |
|---|---|---|
| CN | 101150824 A | 3/2008 |
| CN | 101179806 A | 5/2008 |
| CN | 101304548 A | 11/2008 |
| CN | 101552950 A | 10/2009 |
| WO | 2009044345 A2 | 4/2009 |
| WO | 2011147242 A1 | 12/2011 |

OTHER PUBLICATIONS

English Translation of the Written Opinion of the International Search Authority in international application No. PCT/CN2011/073279, mailed on Aug. 4, 2011.

* cited by examiner

METHOD AND APPARATUS FOR PROCESSING MULTIMEDIA BROADCAST MULTICAST SERVICE (MBMS) COUNTING MESSAGE

TECHNICAL FIELD

The disclosure relates to the field of Multimedia Broadcast Multicast Services (MBMS), in particular to a method and an apparatus for processing an MBMS counting message.

BACKGROUND

Along with the rapid development of the Internet and the popularization of large-scale multi-functional mobile terminal, a large number of mobile data multimedia services and various high-bandwidth multimedia services appear, such as video conferences, television broadcast, video-on-demand, video advertisements, online education, interactive games or the like, which not only meets the increased service requirements of mobile users, but also brings new service growth point to mobile operators. The mobile data multimedia service requires a plurality of users to receive the same data at the same time; and compared with general data service, the mobile data multimedia service has the characteristics of large data amount, long duration, delay sensitivity, or the like. In order to effectively utilize mobile network resources, a 3rd Generation Partnership Project (3GPP) provides a Multimedia Broadcast Multicast Service (MBMS), wherein the service is a technology which transmits data from a data source to a plurality of targets; the sharing of network (including a core network and an access network) resources is realized; and the utilization rate of the network resources (particularly air interface resources) is improved. The MBMS defined by the 3GPP can realize the multicast and the broadcast of plaintext low-speed message classes, realize the broadcast and the multicast of high-speed multimedia services, and also provide various rich video, audio and multimedia services. This undoubtedly adapts to the development trend of future mobile data and provides a better service prospect for the development of the 3rd generation (3G) digital communication.

The MBMS is transmitted in a Multimedia Broadcast Multicast Service Single Frequency Network (MBSFN) mode, and the MBSFN mode here is a multi-cell joint transmission mode, namely cells within a certain geographical area all transmit the same MBMS data at the same time and frequency resources, wherein the certain geographical area is called an MBSFN area; and in such a way, in the overall MBSFN area, electrical signals corresponding to the data transmitted from each cell is overlapped naturally so as to greatly improve signal intensity.

In actual application, a network side has a demand on knowing the reception situation of a certain MBMS service in an MBSFN area, namely knowing that how much User Equipment (UE) is receiving the MBMS service, or how much UE is interested in the MBMS services to be transmitted. When the network side knows that the certain MBMS service is not received by the UE because no user is interested in the certain MBMS service, the network side can stop the transmission of the MBMS service, which can help the network side to save time-frequency resources and save electrical energy.

However, aiming at the demand, there is no corresponding solutions provided in the related art to solve the problems about how the network side transmits a counting message used for requiring UE to perform feedback counting on an MBMS service and detects and performs relative processing on a feedback from the UE, thereby bringing inconvenience to the actual application, and not conducive to the saving of time frequency resources and electric energy on the network side.

SUMMARY

In view of this, the present disclosure mainly aims to provide a method and a apparatus for processing an MBMS counting message, so that a network side can know the reception situation of an MBMS service in an MBSFN area.

In order to fulfill the aim, the technical solution of the present disclosure is realized as follows:

the present disclosure provides a method for processing an MBMS counting message, including:

configuring, by a network side, a counting message for performing feedback counting on an MBMS service; and determining, by the network side, a Multimedia Broadcast Multicast Service Single Frequency Network (MBSFN) area to which the counted MBMS service belongs and a Multimedia Control Channel (MCCH) which corresponds to the MBSFN area, and transmitting the counting message to User Equipment (UE) through carrying the counting message on the MCCH which corresponds to the MBSFN area, or transmitting the counting message to UE through carrying the counting message on a Broadcast Control Channel (BCCH).

The transmitting the counting message to UE through carrying the counting message on a BCCH may include:

when the network side transmits the counting message by taking an MBSFN area as a unit, carrying the counting message in a system information block 13 (SIB13) and transmitting the counting message which serves as a parameter of MBSFN-AreaInfo-r9 to the UE corresponding to the MBMS service; and when the network side transmits the counting message by taking a cell or a base station as a unit, carrying the counting message in the SIB13 and transmitting the counting message which serves as an independent information element to the UE corresponding to the MBMS service.

The network side may include a Multi-Cell Coordination Entity (MCE) and an evolved Node B (eNB);

correspondingly, when MBSFN area overlapped coverage does not exist, the method may further include: generating, by the MCE, the counting message for the MBMS service which needs to be subjected to the feedback counting, and transmitting by the MCE the counting message generated to all relative eNBs in the MBSFN area to which the MBMS service belongs; and transmitting the counting message to UE by the eNBs.

The network side may include an MCE and an eNB;

correspondingly, when MBSFN area overlapped coverage exists, the method may further include:

generating, by the MCE, the counting message for the MBMS service which needs to be subjected to the feedback counting and determining the MBSFN area where the counting message is transmitted, or the MCCH through which the counting message is transmitted; and transmitting the counting message generated to all relative eNBs in the MBSFN area to which the MBMS service belongs by the MCE; and transmitting the counting message to UE by the eNBs.

After the counting message is transmitted to the UE, the method may further include: detecting a feedback from the UE and analyzing a reception situation of the MBMS service at the UE by the network side.

The detecting a feedback from the UE by the network side may include:

adopting a first detection mode to detect the feedback from the UE and determining whether there is UE receiving the MBMS service according to a detection result under the first detection mode by the network side; and when determining that there is UE receiving the MBMS service, adopting, by the network side, a second detection mode to analyze uplink feedback information transmitted by the UE to obtain data which is fed back by the UE.

The configuring by a network side a counting message for performing feedback counting on an MBMS service may include:

configuring a counting message for each MBSFN area respectively by the network side, wherein the counting message is only transmitted in an MBSFN sub-frame corresponding to the each MBSFN area; and in a cell which is covered by the MBSFN areas in a overlapping manner, the counting message of the each MBSFN area only contains an MBMS service in an MBSFN area for which the counting message is configured.

The configuring a counting message for performing feedback counting on an MBMS service by a network side may include:

configuring a common counting message for all MBSFN areas by the network side; wherein only one counting message is configured for a cell, and the counting message contains all MBMS services which need to be subjected to feedback counting in one or more MBSFN areas in the cell.

The present disclosure also provides an apparatus for processing an MBMS counting message, which is applied to a network side. The apparatus includes:

a message configuration module, configured to configure a counting message for performing feedback counting on an MBMS service; and a message transmission module, configured to determine a Multimedia Broadcast Multicast Service Single Frequency Network (MBSFN) area to which the counted MBMS service belongs and a Multimedia Control Channel (MCCH) which corresponds to the MBSFN area, and transmit the counting message to User Equipment (UE) through carrying the counting message on the MCCH which corresponds to the MBSFN area, or transmit the counting message to UE through carrying the counting message on a Broadcast Control Channel (BCCH).

The message transmission module may be further configured to carry the counting message in a system information block 13 (SIB13) and transmit the counting message which serves as a parameter of MBSFN-AreaInfo-r9 the to the UE corresponding to the MBMS service when transmitting the counting message through the BCCH by taking an MBSFN area as a unit; and the message transmission module may be further configured to carry the counting message in the SIB13 and transmit the counting message which serves as an independent information element to the UE corresponding to the MBMS service when transmitting the counting message through the BCCH by taking a cell or a base station as a unit.

The apparatus may further include a detection and analysis module configured to detect a feedback from the UE and analyze a reception situation of the MBMS service at the UE.

The detection and analysis module may be further configured to detect the feedback from the UE by adopting a first detection mode and determine whether there is UE receiving the MBMS service according to a detection result under the first detection mode; and when determining that there is UE receiving the MBMS service, the detection and analysis module is configured to adopt a second detection mode to analyze uplink feedback information transmitted by the UE to obtain data which is fed back by the UE.

In the method and the apparatus for processing an MBMS counting message provided by the present disclosure, a network side configures a counting message for performing feedback counting on an MBMS service and transmits the counting message to UE corresponding to the MBMS service through carrying the counting message on an MCCH or a BCCH; and the network side detects a feedback from the UE and analyzes the reception situation of the MBMS service at the UE.

Through the present disclosure, when MBSFN area overlapped coverage exists, a network side only transmits a counting message through an MCCH corresponding to an MBSFN area in which an MBMS service needed to be counted is located, so that no influence is brought to other MBSFN areas, therefore, the target of the counting message is more clear, and relative UE can clearly know a feedback object conveniently and feedback information can be transmitted conveniently. In addition, in the present disclosure, two modes for detecting a feedback from UE are applied at the same time, so that the network detection speed is higher; the network detection modes can be selected based on different demands, so that the network side can simplify a detection process. Once the network side knows that there is UE which is receiving the MBMS service, UE which does not return feedback information in time can be stopped feeding back, which helps the UE to save power; when the network side knows that no (or few) UE is receiving the MBMS service, the transmission of the MBMS service can be closed so as to save time-frequency resources and save electric energy.

DETAILED DESCRIPTION

The technical solution of the present disclosure is further described below with reference to the accompanying drawings and embodiments in detail.

Figure 1:
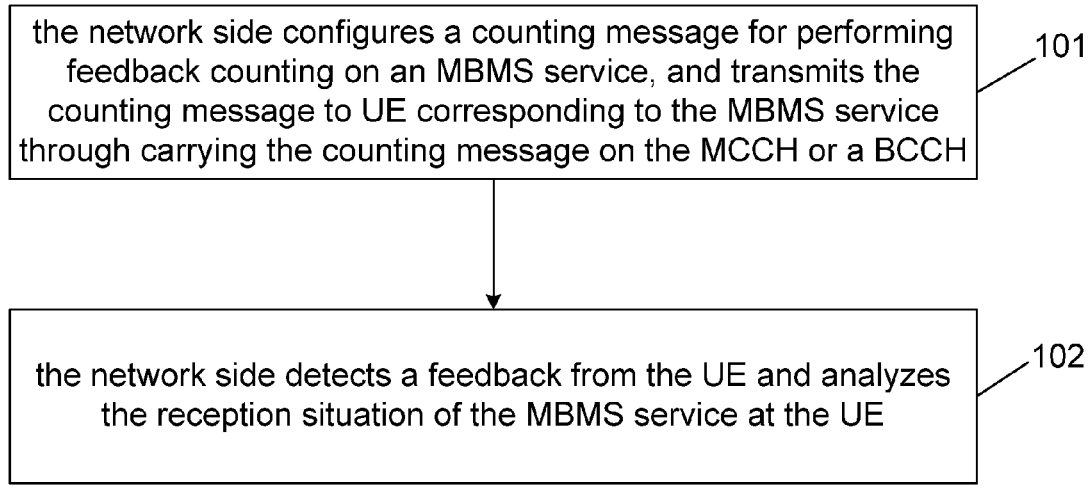
FIG. 1 is a flowchart of a method for processing an MBMS counting message.

A method for processing an MBMS counting message provided by the disclosure, as shown in the FIG. 1, mainly comprises the following steps.

Step 101, a network side configures a counting message for performing feedback counting on an MBMS service, and transmits the counting message to UE corresponding to the MBMS through carrying the counting message on an MCCH or a BCCH.

The aim and the function of the counting message in the disclosure are that the network side is used for informing UE, and needs to know the reception situation of one or more MBMS services on the UE side. The network side transmits a counting message; after the UE receives the counting message, the UE uplinks feedback information about whether the UE is receiving the MBMS service to the network side according to the requirement of the counting message. The present disclosure mainly emphasizes the transmission of parameters having the above aim and function, the counting message is only an appellation; and all parameters having the aim and the function above can use the transmitting mode of the present disclosure.

In the present disclosure, the network side can respectively configure a counting message for each MBSFN area, and transmit the counting message in an MBSFN sub-frame corresponding to each MBSFN area, wherein the counting message of each MBSFN area only contains an MBMS service in an MBSFN area for which the counting message is configured. In a cell which is covered by the MBSFN areas in an overlapping manner, a counting message can be configured for each MBSFN area respectively. Of course, a common counting message also can be configured for all MBSFN areas; at the moment, only one counting message exists in a cell, and the counting message can contain all MBMS services which need to be subjected to feedback counting in one or more MBSFN areas in the cell, and furthermore, the period and position information (wireless frame or sub-frame information) of the common counting message needs to be transmitted through the BCCH.

The so-called transmitting a counting message to UE through carrying the counting message on an MCCH specifically comprises two modes, which are respectively described as follows:

1. the network side determines an MBSFN area to which the counted MBMS belongs and an MCCH corresponding to the MBSFN area, and transmits the counting message to the UE through carrying the counting message on the MCCH corresponding to the MBSFN area. The UE receives the counting message on the MCCH, and determines which MBMS needs to be subjected to feedback counting according to an MBMS identifier in the counting message in the MBSFN area corresponding to the MCCH. If several cells are covered by a plurality of MBSFN areas in an overlapping manner, the cell has a plurality of MCCHs for transmission. The UE only needs to receive and process a counting message contained in the MCCH interested by the UE per se.

The network side transmits a counting message to the UE through an MCCH corresponding to an MBSFN area in which an MBMS service needed to be counted is located.

For example, an MBSFN Area Configuration message can be carried on the MCCH in Long Term Evolution (LTE); and the counting message can serve as an independent message and be transmitted over the MCCH, or the position of the counting message in the MBSFN Area Configuration message in the MCCH is shown as follows:

```
-- ASN1START
MBSFNAreaConfiguration-r9 ::=    SEQUENCE {
    commonSF-Alloc-r9            CommonSF-AllocPatternList-r9,
    commonSF-AllocPeriod-r9      ENUMERATED {
                                 rf4 , rf8 , rf16 , rf32, rf64, rf128,
                                 rf256},
    pmch-InfoList-r9             PMCH-InfoList-r9,
    counting message
    nonCritical Extension        SEQUENCE { } OPTIONAL --
                                 Need OP
    }
    CommonSF-AllocPatternList-r9 ::= SEQUENCE        (SIZE
(1...maxMBSFN-Allocations))OF MBSFN-SubframeConfig
    -- ASN1STOP
```

2. the network side determines an MBSFN area to which the counted MBMS belongs and an MCCH corresponding to the MBSFN area, and transmits the counting message to the UE through carrying the counting message on the MCCH corresponding to the MBSFN area. The counting message is designed in the following mode and is transmitted to the UE in the following mode: a parameter MBMS-SessionInfo-r9 in a parameter pmch-InfoList-r9 in the MCCH is used, wherein the parameter MBMS-SessionInfo-r9 can comprise a plurality of sets, each set comprises three parameters, namely tmgi-r9, sessionId-r9, logicalChannelIdentity-r9; the three parameters represent the relevant information of one MBMS service and are used for identifying the MBMS service; and according to the disclosure, a counting message is further needed to be added into the MBMS-SessionInfo-r9. For example, the following example shows the case comprising two sets of parameters. The parameter MBMS-SessionInfo-r9 designed according to the present disclosure is shown as follows:

```
MBMS-SessionInfo-r9 ::=          SEQUENCE {
    tmgi-r9                      TMGI-r9,
    sessionId-r9                 OCTET STRING (SIZE(1))
    logicalChannelIdentity-r9    INTEGER
    (0...maxSessionPerPMCH−1),
    counting message
    tmgi-r9                      TMGI-r9,
    sessionId-r9                 OCTET STRING(SIZE(1))
    logicalChannelIdentity-r9    INTEGER
    (0...maxSessionPerPMCH−1),
    counting message
    ...
}
```

In such mode, the design of the counting message is simple, which only needs one bit of indication information for indicating whether the MBMS service needs to be counted or not. In specific implementation, the indication information can be only one bit; when the bit is 1, the indication information represents that the MBMS service described by three parameters (namely the tmgi-r9, the sessionId-r9, and the logicalChannelIdentity-r9) in one set in the MBMS-SessionInfo-r9 needs to be subjected to feedback counting, otherwise, the MBMS service does not need to be subjected to the feedback counting. In addition, counting-type indication information also can be added into the counting message in order to inform UE what the MBMS service needs is just information about whether there is UE receiving simply, or information about which UE is receiving specifically. In this implementation, 2 bits are needed for representing information about whether feedback counting is needed and information about a feedback counting type at the same time. When a counting message is transmitted in such mode, the counting message does not need contain MBMS identity information, because one MBMS service has been determined by the three parameters (namely the tmgi-r9, the sessionId-r9, and the logicalChannelIdentity-r9) in the parameter MBMS-SessionInfo-r9 according to an LTE protocol, and if a counting message is added into the parameter, the counting message describes by default whether an MBMS service needs to be subjected to feedback counting, as described by the three original parameters in the parameter.

The so-called transmitting a counting message to UE corresponding to an MBMS service through carrying the counting message on a BCCH specifically comprises:

1. when the network side respectively configures a counting message for each MBSFN area (namely when the network side configures and transmits a counting message by taking an MBSFN area as a unit), the counting message is carried in a system information block 13 (SIB13) to serve as a parameter of the MBSFN-AreaInfo-r9 and is transmitted to the UE corresponding to the MBMS service; and if the SIB13 has a plurality of MBSFN-AreaInfo-r9s, then a counting message is configured in MBSFN-AreaInfo-r9 corresponding to an MBSFN area to which a counted MBMS belongs. The position of the counting message in the MBSFN-AreaInfo-r9 is shown as follows:

```
-- ASN1START
MBSFN-AreaInfoList-r9 ::=       SEQUENCE(SIZE(1...maxMBSFN-
                                    Area))
OF MBSFN-AreaInfo-r9
MBSFN-AreaInfo-r9 ::=           SEQUENCE {
    mbsfn-AreaId-r9                 INTEGER(0...255),
    counting message
    non-MBSFNregionLength           ENUMERATED {s1 , s2},
    notificationIndicator-r9        INTEGER(0...7),
    mcch-Config-r9                  SEQUENCE {
        mcch-RepetitionPeriod-r9        ENUMERATED{rf32, rf64, rf128,
                                            rf256},
        mcch-Offset-r9                  INTEGER(0...10),
        mcch-ModificationPeriod-r9      ENUMERATED {rf512, rf1024},
        sf-AllocInfo-r9                 BIT STRING(SIZE(6)),
        signallingMCS-r9                ENUMERATED {n2, n7, n13, n19}
    },
    ...
}
-- ASN1STOP
```

2. when the network side configures a common counting message for all MBSFN areas in a cell, the counting message is transmitted by taking a cell or a base station as a unit, and the counting message is carried in the SIB13 to serve as an independent information element and is transmitted to the UE corresponding to the MBMS service; and the counting message is at the same position as the mbsfn-AreaInfoList-r9 and the notificationConfig-r9 in the SIB13. The position of the counting message in the SIB13 is shown as follows:

```
-- ASN1START
SystemInformationBlockType13-r9 ::=     SEQUENCE {
    mbsfn-AreaInfoList-r9                   MBSFN-AreaInfoList-r9,
    notificationConfig-r9                   MBMS-NotificationConfig-r9,
    counting message
    lateR9NonCriticalExtension              OCTET STRING
    ...
}
-- ASN1STOP
```

In such mode, after receiving the SIB13, the UE acquires the counting message from the SIB13, acquires an identifier of an MBMS service needing to be counted from the counting message, further determines which MBSFN area the service belongs to, and then determines whether the service is the service which is being received by the UE per se or the service interested by the UE per se, and if so, the UE transmits uplink feedback information to the network side.

Step 102, the network side detects a feedback from the UE and analyzes a reception situation of the MBMS service at the UE.

The operation mode of the Step 102 can be selected from the following two detection and analysis modes:

the first detection mode is that: the network side detects, on the uplink feedback resources distributed for the MBMS service, the energy of data transmitted by UE; if the energy of the data transmitted by the UE exceeds a given energy threshold, then the network side determines that there is UE receiving the MBMS service, otherwise, the network side determines that there is no UE receiving the MBMS service, wherein the energy threshold can be set according to simulation. The step of detecting the energy of the data transmitted by the UE is specifically as follows: performing correlated operation on a sequence needed to be feed back through uplink by the UE and a received sequence which is feed back through uplink by the UE, and taking a result of the correlated operation as the energy of the data transmitted by the UE.

The second detection mode is that: the network side receives, on the uplink feedback resources distributed for the MBMS service, a sequence which is feed back by UE through uplink; according to the sequence fed back by the UE, after determining that the UE finishes uplink synchronization, the network side distributes uplink physical resources used for MBMS feedback for each UE which has been subjected to the uplink synchronization; and the network side analyzes uplink feedback information transmitted by the UE through the uplink physical resources to obtain the data feed back by the UE. Certainly, if the uplink feedback information transmitted by the UE includes identity information of the UE per se, the network side also can know which UE is receiving the MBMS service.

Aiming at the two detection and analysis modes above, the network side can decide which detection mode is used according to a counting demand. When the network side only needs to know whether there is UE receiving the MBMS service, the network side uses the first detection mode; when the network side wants to know which UE is receiving the MBMS service specifically, the network side uses the second detection mode or preferably uses the first detection mode, i.e. when a conclusion obtained by the first detection mode is that there is UE receiving, the second detection mode is used continuously, otherwise, the detection is stopped. Here, the detection principle of the second detection mode is similar to the detection principle of the first detection mode.

In addition, the network side in the present disclosure comprises the following devices: a Multi-cell/multicast Coordination Entity (MCE), an evolved NodeB (Enb), a Relay Station (Relay), a Broadcast Multicast Service Center (BMSC), a BMSC gateway (BMSC GW), or the like. The method for processing an MBMS counting message is further described below with reference to the embodiments in detail.

In embodiment 1 of the present disclosure, suppose there is a certain scene in which no MBSFN area overlapped coverage occurs, namely within a certain geographical area, only one MBSFN area covers all cells in the geographical area. When the MCE on the network side decides to perform feedback counting aiming at a certain MBMS service, the MCE configures a counting message of the MBMS service, and transmits the configured counting message which serves as information in an MCCH to the eNB; and the eNB transmits the counting message to UE. The counting message serves as a parameter in the same rank as the parameters such as commonSF-Alloc-r9, commonSF-AllocPeriod-r9 and pmch-InfoList-r9 in the current MCCH and is carried on the MCCH. Since this embodiment is implemented in the situation of single MBSFN area coverage, an MCCH selecting process is not needed.

In addition, since a new MCCH transmission mechanism is introduced into an LTE system, namely transmission is carried out on an MCCH using an MBSFN mode, a counting message is required to be transmitted uniformly in an MCCH of each cell in the overall MBSFN area, and the contents in the MCCH of each cell are completely the same. Aiming at this situation, in the disclosure, preferably, a counting message in an MCCH is configured by an MCE corresponding to an MBSFN area to which a counted MBMS service belongs; the counting message is transmitted to a relative eNB after being configured by the MCE; the eNB generates final MCCH information according to relative configuration information transmitted by the MCE, wherein the final MCCH information contains the counting message; and then the eNB transmits the final MCCH information to the UE. Of course, only the service identity (service ID) (or other identity which can be identified by the eNB) of the MBMS service needing to be subjected to feedback counting can be transmitted to the relative eNB by the MCE; then the eNB generates a counting message aiming at the MBMS service, and transmits the counting message which serves as part of the MCCH information to the UE. In the above two paragraphs, the processes for configuring and transmitting a counting message are given, namely after the MCE receives a notification from an upper layer network element, the MCE generates a counting message for an MBMS service which needs to be subjected to feedback counting, and transmits the generated counting message to all relative eNBs in the MBSFN area to which the MBMS service belongs; and then the eNB transmits the corresponding counting message to the UE.

In the embodiment 2 of the disclosure, suppose there is a case where MBSFN area overlapped coverage exists, namely within a certain geographical area, a plurality of MBSFN areas cover all (or part) cells in an overlapping manner in the geographical area, then the all (or part of) cells are called a cell where MBSFN area overlapped coverage happens. When the network side decides to perform feedback counting aiming at a certain MBMS service, an MBSFN area to which the MBMS service belongs and an MCCH corresponding to the MBSFN area are needed to be determined; the configured counting message serves as information in the MCCH corresponding to the MBSFN area to which the MBMS service belongs and is transmitted to the UE through the eNB. The counting message should serve as the parameter in the same rank as the parameters such as the commonSF-Alloc-r9, the commonSF-AllocPeriod-r9 and the pmch-InfoList-r9 in the current MCCH and is included in the MCCH. Since the embodiment is implemented in the situation of multi-MBSFN area overlapped coverage, the network side needs to configure and transmit a counting message of an MBMS service in an MCCH corresponding to an MBSFN area to which a counted MBMS belongs; thus, equivalently, the counting message is transmitted in the MCCH by taking an MBSFN area as a unit; and for each MBSFN area, only a counting message of an MBMS service in an area for which the counting message is configured can be transmitted. In this paragraph, the processes for configuring and transmitting a counting message in the situation of MBSFN area overlapped coverage are given, namely the MCE needs to generate a counting message for an MBMS which needs to be subjected to feedback counting, and determines MBSFN area information in the transmission of the counting message or MCCH information in the transmission of the counting message, and then transmits the generated counting message to all relative eNBs in the MBSFN area to which the MBMS service belongs; and the eNB transmits the corresponding counting message to the UE.

In addition, since a new MCCH transmission mechanism is introduced into the LTE system, namely transmission is performed on an MCCH using an MBSFN mode, a counting message is required to be transmitted uniformly in an MCCH of each cell in the overall MBSFN area, and the contents in the MCCH of each cell are completely the same. Aiming at the situation, in the disclosure, preferably, a counting message in an MCCH is configured by an MCE corresponding to an MBSFN area to which an MBMS service belongs; the counting message is transmitted to a relative eNB after being configured by the MCE; the eNB generates final MCCH information according to relative configuration information transmitted by the MCE, wherein the final MCCH information contains the counting message; and then the eNB transmits the final MCCH information to the UE. Of course, only the service ID (or other identity which can be identified by the eNB) of the MBMS service needing to be subjected to feedback counting can be transmitted to the relative eNB by the MCE; then the eNB generates a counting message aiming at the MBMS service, and transmits the counting message which serves as part of the MCCH information to the UE.

In the embodiment 3 of the disclosure, a counting message is carried in a System Information Block (SIB) on a BCCH for transmission, particularly the counting message is specifically carried in SIB13.

When the network side decides to perform feedback counting aiming at a certain MBMS service, a counting message of the MBMS service is configured and is carried in the SIB13. Specific carrying modes comprise the following two modes:

one is that: each MBSFN area has a unique counting message configured for itself, wherein the counting message is only the counting message of the MBMS service in an MBSFN area for which the counting message is configured; when the network side transmits the counting message by taking the MBSFN area as a unit, the counting message is carried in the SIB13 to serve as a parameter of the MBSFN-AreaInfo-r9 and is transmitted to the UE; when the SIB13 has a plurality of the MBSFN-AreaInfo-r9s, then the counting message is configured only in the MBSFN-AreaInfo-r9 corresponding to the MBSFN area to which the MBMS service belongs, and the counting message serves as an information element in the SIB13;

the other is that: a common counting message is configured for all MBSFN areas, wherein the counting message comprises MBMS services needing to be counted in all MBSFN areas to which a cell belongs; when the network side configures and transmits a counting message by taking a cell (or a base station) as a unit, the counting message is configured by a base station to which the cell belongs and is carried in the SIB13 to serve as an independent information element and serves as a parameter which is at the same position as the mbsfn-AreaInfoList-r9 and the notificationConfig-r9.

The benefits of transmitting a counting message by taking a cell (or a base station) as a unit are that: the network side transmits a counting message only aiming at a specific cell which may have no UE receiving an MBMS service, so that other cells (base stations) in the overall MBSFN area are not influenced. The application has very high flexibility, for example, independent feedback counting can be performed aiming at a cell (such as a suburban cell) with few users.

The embodiment 4 of the disclosure relates to transmission of a counting message by a network side, and detection and analysis processing of feedback information by the network side after it receives a feedback from UE.

Figure 2:
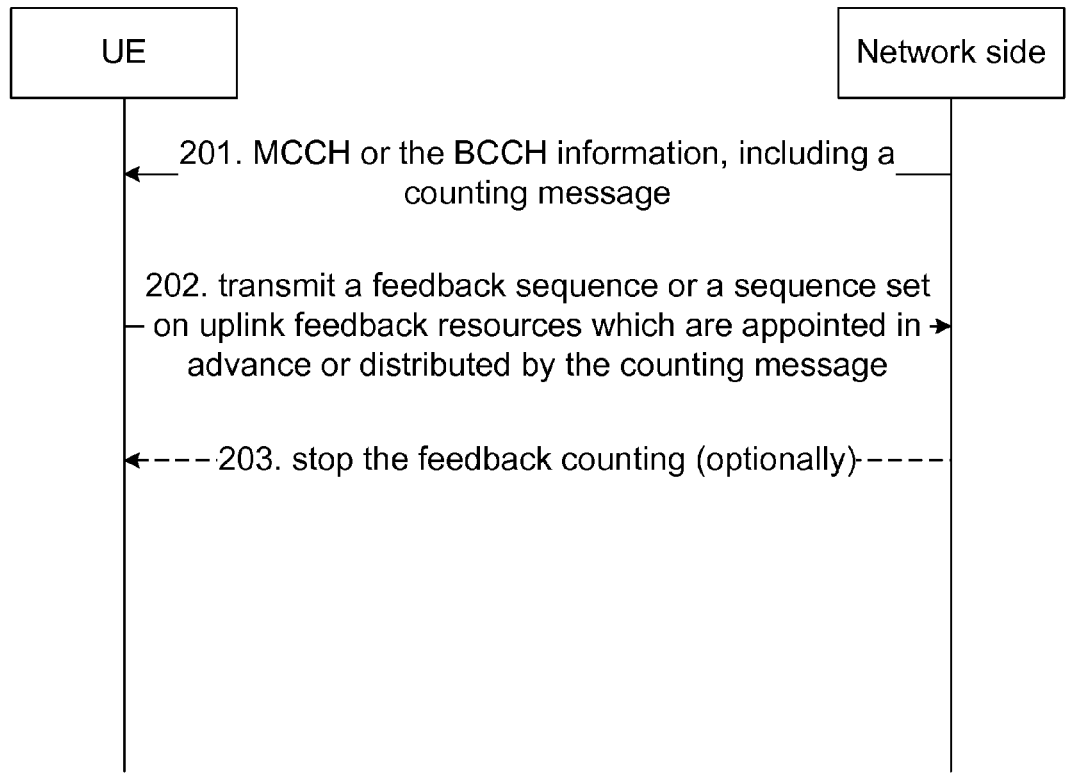
FIG. 2 illustrates a flowchart corresponding to a first detection and analysis mode in an embodiment of the present disclosure.
Figure 3:
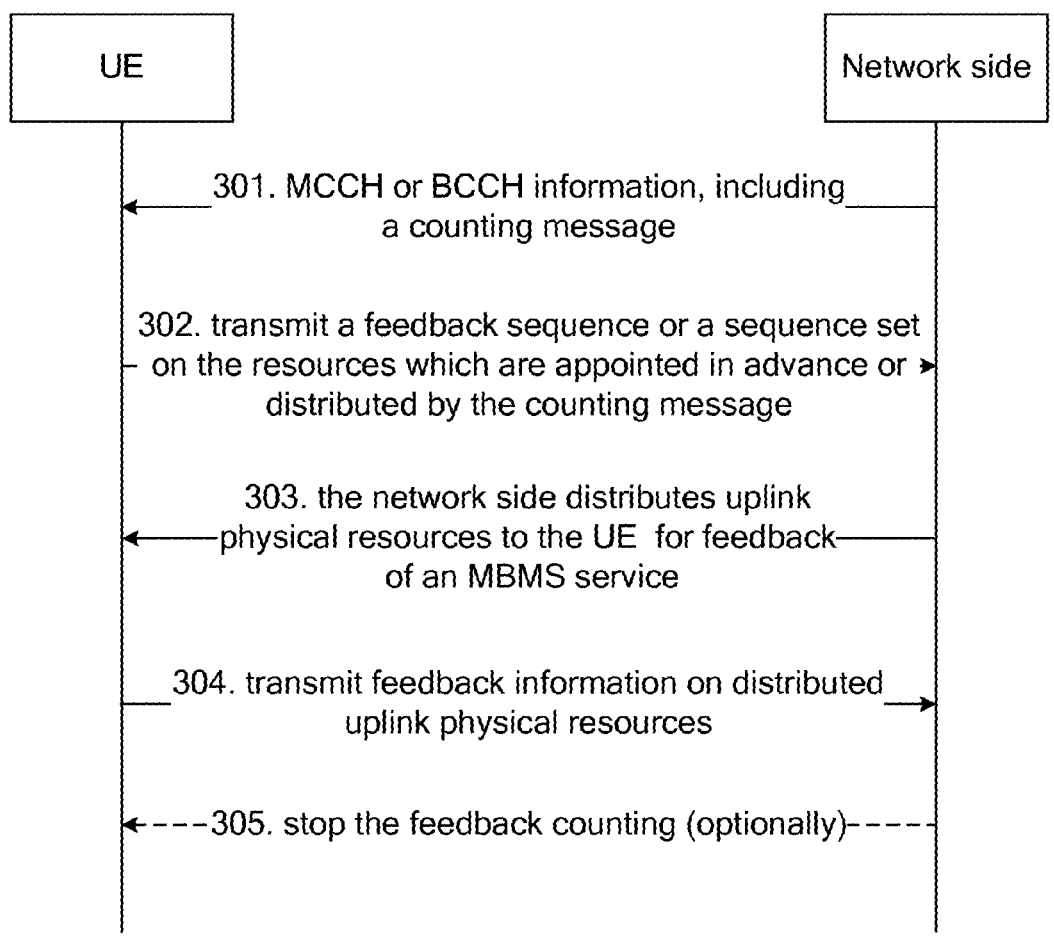
FIG. 3 illustrates a flowchart corresponding to a second detection and analysis mode in an embodiment of the present disclosure.

FIG. 2 and FIG. 3 respectively show a basic flowchart of the embodiment. The network side transmits a counting message which is configured for a certain MBMS service in the mode described in the above embodiments; after UE receives the counting message from the network side, uplink feedback information (generally a prescribed sequence or a sequence set) required by the network side is transmitted aiming at the counted MBMS service on uplink feedback resources distributed for the counting message or uplink feedback resources appointed in advance according the requirement of the counting message; and the network side receives uplink feedback information from relative UE on the distributed resources. The network side carries out specific processing in the following two modes, and selects different detection modes according to different counting demands.

The first detection mode is that: as shown in FIG. 2, firstly, the network side transmits a counting message to UE (Step 201); secondly, the UE transmits a feedback sequence on uplink feedback resources which are appointed in advance or distributed by the counting message (Step 202), here, the resources are the resources provided by the network side for the uplink feedback of the MBMS service, and the feedback sequence aiming at the MBMS service is prescribed; all UE which are receiving the MBMS service (including an RRC_IDLE mode and an RRC_CONNECTED mode, wherein the UE in the IDLE mode does not need uplink synchronization) transmit the feedback sequence on the resources; and finally, the network side detects the energy (or power, in the following, taking the energy as an example for explanation) of a received sequence on the resources where the UE transmits the uplink feedback information. the energy is detected in the following manner: the network side performs correlated operation by using a sequence needed to be feed back by the UE through uplink and a sequence which is feed back by the UE through uplink and is received by the network side, a result of the correlation operation can serve as an energy value received from the resources, and then the obtained energy value is compared with a given threshold of the energy value; if the obtained energy value is higher than the given energy threshold, then the network side determines that the energy of data which is feed back through uplink by the UE aiming at the MBMS service is detected on the resources, so as to consider that there is UE receiving the MBMS service, otherwise, consider that there is no UE receiving the MBMS service. Optionally, after the counting and analysis operation is finished, the network side can notify the UE to stop the feedback counting (Step 203).

The second detection mode is that: as shown in FIG. 3, firstly, the network side transmits a counting message to UE (Step 301); secondly, the UE transmits a feedback sequence on uplink feedback resources which are distributed by the counting message or appointed in advance (Step 302); the network side detects and receives a sequence which is fed back by the UE on the resources on which the UE transmits the uplink feedback information; the detection mode used here has the same the principle as the first detection mode, namely a energy threshold is determined by performing correlation operation on received information and a known sequence, the only difference is that the sequences used for performing the correlation detection are different, and this step mainly helps UE in the IDLE mode to finish uplink synchronization; thirdly, the network side distributes uplink physical resources used for feedback of an MBMS service for each UE which has been subjected to the uplink synchronization (Step 303); subsequently, the UE transmits the uplink feedback information to the network side on the distributed resources (Step 304); and the network side receives the uplink feedback information and performs decoding processing on the uplink feedback information so as to obtain the data transmitted by the UE. The network side receives the uplink feedback data from the UE on the distributed resources, and performs relative analysis processing, including channel estimation, decoding processing or the like, on the data so as to obtain the data fed back by the UE. According to the data fed back by the UE, the network side at least can obtain that there is UE receiving the MBMS service. Of course, if the data fed back the UE further comprises UE identity information, then the network side also can know which UE is receiving the MBMS service. Optionally, after the counting and analysis operation is finished, the network side can notify the UE to stop the feedback counting (Step 305).

Figure 4:
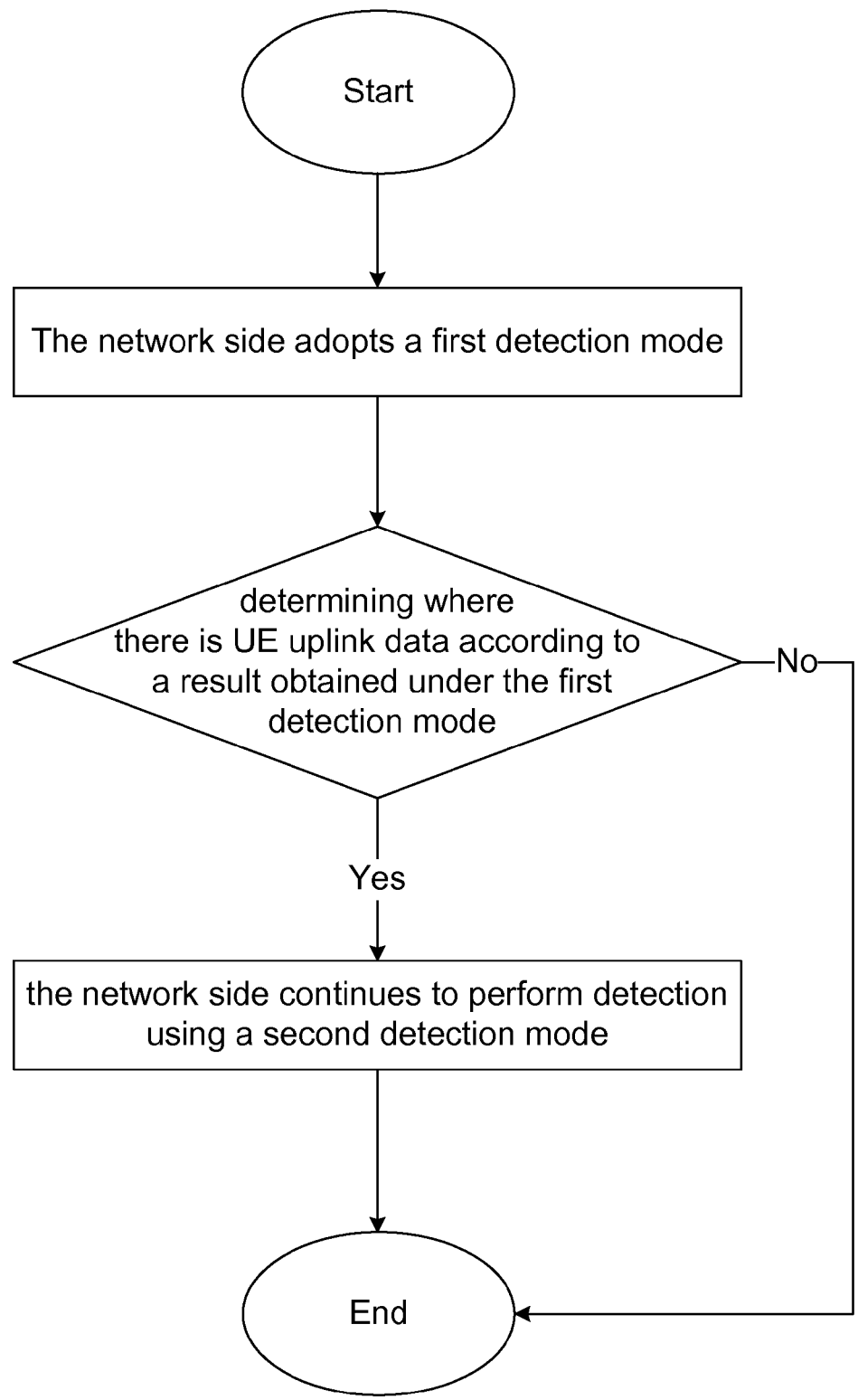
FIG. 4 illustrates a flowchart of the application which combines the two detection and analysis modes in an embodiment of the present disclosure.

The network side determines which receiving and detection mode is preferentially used according to different counting demands and in consideration of the corresponding MBMS feedback mechanism adopted by the network side. When the network side only needs to know whether there is UE receiving a certain MBMS service, the network side uses the first detection mode preferentially, namely the network side performs correlation operation by using a sequence distributed for the MBMS service and received data fed back by the UE to detect the energy of the data. Compared with the second detection mode, the first detection mode has a high detection speed and a simple detection process, and is easy to realize. Optionally, when the network side has known that there is the UE receiving the MBMS service, the network side can inform the UE, and the counting process is ended; at the moment, UE which does not return a feedback in time does not need to transmit feedback information. This optional function have achieve a better effect when the resources distributed for the MBMS service by the network side are in different uplink sub-frames. When the network side needs to know which UE are receiving the MBMS service, as shown in FIG. 4, the first detection mode is used by the network side preferentially; if a result obtained under the first detection mode is that there is UE on the resources which transmits uplink feedback data aiming at the MBMS service (namely the detection energy exceeds a given threshold), then the network side continues performing the detection in the second detection mode, otherwise, the network side does not continue performing the detection on the resources.

It should be noted that, one feedback mode prescribed by the network side is that: different resources are distributed for MBMS services which need to be subjected to feedback counting, different feedback sequences are distributed for different MBMS services; and another feedback mode prescribed by the network side is that: different resources are distributed for MBMS services which need to be subjected to feedback counting, and the same feedback sequence is distributed for different MBMS services. In the two situations, only whether there is UE receiving a certain MBMS service is obtained, therefore, the network side uses the first detection mode, namely the network side performs correlation operation by using a sequence distributed for the MBMS service and received data which is fed back by the UE to detect the energy of the data. Compared with the second detection mode, the first detection mode has a high detection speed and a simple detection process, and is easy to realize. Optionally, when the network side has known there is UE receiving the MBMS service, the network side can inform the UE, and the counting process is ended; at the moment, UE which fails to feed back information in time does not need to transmit feedback information; and a better effect of the optional function can be achieved when the resources distributed by the network side for the MBMS service are on different uplink sub-frames.

Corresponding to the method for processing an MBMS counting message, the disclosure also provides an apparatus for processing an MBMS counting message. The apparatus comprises a message configuration module, a message transmission module, and a detection and analysis module, wherein the message configuration module is configured to configure a counting message for performing feedback counting on an MBMS service; the message transmission module is configured to determine an MBSFN area to which the counted MBMS belongs and an MCCH which corresponds to the MBSFN area, and transmit the counting message to UE through carrying the counting message on the MCCH which corresponds to the MBSFN area, or transmit the counting message to the UE through carrying the counting message on a BCCH; and the detection and analysis module is configured to detect a feedback from the UE and analyze a reception situation of the MBMS service at the UE.

Preferably, the message transmission module is further configured to, when the counting message is transmitted through the BCCH by taking the MBSFN area as a unit, carry the counting message in SIB13 and transmit the counting message which serves as a parameter of MBSFN-AreaInfo-r9 to the UE corresponding to the MBMS service; and the message transmission module is further configured to, when the counting message is transmitted through the BCCH by taking a cell or a base station as a unit, carry the counting message in the SIB13 and transmit the counting message which serves as an independent information element to the UE corresponding to the MBMS service.

The detection and analysis module is further configured to adopt a first detection mode to detect a feedback from the UE, determine whether there is UE receiving the MBMS service according to a detection result under the first detection mode, and adopt a second detection mode to analyze uplink feedback information transmitted by the UE to obtain data fed back by the UE when the detection and analysis module determines that there is UE receiving the MBMS service.

The above are only preferred embodiments of the disclosure and not intended to limit the scope of the protection of the disclosure.

The invention claimed is:

1. A method for processing a Multimedia Broadcast Multicast Service (MBMS) counting message, comprising:
   configuring, by a network side, a counting message for performing feedback counting on an MBMS service; and
   determining, by the network side, a Multimedia Broadcast Multicast Service Single Frequency Network (MBSFN) area to which the counted MBMS service belongs and a Multimedia Control Channel (MCCH) which corresponds to the MBSFN area, and transmitting the counting message to User Equipment (UE) through carrying the counting message on the MCCH which corresponds to the MBSFN area,
   wherein the network side comprises an MCE and an eNB;
   when MBSFN area overlapped coverage exists, the method further comprises:
   generating, by the MCE, the counting message for the MBMS service which needs to be subjected to the feedback counting and determining the MBSFN area where the counting message is transmitted, or the MCCH through which the counting message is transmitted; and
   transmitting the counting message generated to all relative eNBs in the MBSFN area to which the MBMS service belongs by the MCE; and transmitting the counting message to UE by the eNBs;
   wherein the configuring by a network side a counting message for performing feedback counting on an MBMS service comprises:
   configuring a counting message for each MBSFN area respectively by the network side, wherein the counting message is only transmitted in an MBSFN sub-frame corresponding to the each MBSFN area; and in a cell which is covered by the MBSFN areas in a overlapping manner, the counting message of the each MBSFN area only contains an MBMS service in an MBSFN area for which the counting message is configured.

2. The method for processing an MBMS counting message according to claim 1, wherein the network side comprises a Multi-Cell Coordination Entity (MCE) and an evolved Node B (eNB);
   correspondingly, when MBSFN area overlapped coverage does not exist, the method further comprises: generating, by the MCE, the counting message for the MBMS service which needs to be subjected to the feedback counting, and transmitting by the MCE the counting message generated to all relative eNBs in the MBSFN area to which the MBMS service belongs; and transmitting the counting message to UE by the eNBs.

3. The method for processing an MBMS counting message according to claim 1, further comprising: after transmitting the counting message to the UE, detecting a feedback from the UE and analyzing a reception situation of the MBMS service at the UE by the network side.

4. The method for processing an MBMS counting message according to claim 3, wherein the detecting a feedback from the UE by the network side comprises:
   adopting a first detection mode to detect the feedback from the UE and determining whether there is UE receiving the MBMS service according to a detection result under the first detection mode by the network side; and
   when determining that there is UE receiving the MBMS service, adopting, by the network side, a second detection mode to analyze uplink feedback information transmitted by the UE to obtain data which is fed back by the UE.

5. The method for processing an MBMS counting message according to claim 1, wherein the configuring a counting message for performing feedback counting on an MBMS service by a network side comprises:
   configuring a common counting message for all MBSFN areas by the network side; wherein only one counting message is configured for a cell, and the counting message contains all MBMS services which need to be subjected to feedback counting in one or more MBSFN areas in the cell.

6. An apparatus for processing a Multimedia Broadcast Multicast Service (MBMS) counting message, applied to a network side, comprising:
   a message configuration module, configured to configure a counting message for performing feedback counting on an MBMS service; and
   a message transmission module, configured to determine a Multimedia Broadcast Multicast Service Single Frequency Network (MBSFN) area to which the counted MBMS service belongs and a Multimedia Control Channel (MCCH) which corresponds to the MBSFN area, and transmit the counting message to User Equipment (UE) through carrying the counting message on the MCCH which corresponds to the MBSFN area,
   wherein when MBSFN area overlapped coverage exists, the message transmission module is further configured to determine the MBSFN area where the counting message is transmitted, or the MCCH through which the counting message is transmitted and transmit the counting message generated to all related eNBs in the MBSFN area to which the MBMS service belongs, so that the eNBs transmit the counting message to UE, and
   wherein the message configuration module configures a counting message for each MBSFN area respectively by the network side, wherein the counting message is only transmitted in an MBSFN sub-frame corresponding to the each MBSFN area; and in a cell which is covered by the MBSFN areas in a overlapping manner, the counting message of the each MBSFN area only contains an MBMS service in an MBSFN area for which the counting message is configured.

7. The apparatus for processing an MBMS counting message according to claim 6, further comprising a detection and analysis module configured to detect a feedback from the UE and analyze a reception situation of the MBMS service at the UE.

8. The apparatus for processing an MBMS counting message according to claim 7, wherein the detection and analysis module is further configured to detect the feedback from the UE by adopting a first detection mode and determine whether there is UE receiving the MBMS service according to a detection result under the first detection mode; and when determining that there is UE receiving the MBMS service, the detection and analysis module is configured to adopt a second detection mode to analyze uplink feedback information transmitted by the UE to obtain data which is fed back by the UE.

* * * * *